(12) United States Patent
Albero et al.

(10) Patent No.: US 12,455,979 B2
(45) Date of Patent: Oct. 28, 2025

(54) PERMISSION BASED INFORMATION TRANSFER BASED ON INTERNET OF THINGS (IoT) INSIGHTS

(71) Applicant: Bank of America Corporation, Charlotte, NC (US)

(72) Inventors: George Albero, Charlotte, NC (US); Maharaj Mukherjee, Poughkeepsie, NY (US); Ariel Fontaine Hill, Arlington, VA (US); Elijah John Clark, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 22 days.

(21) Appl. No.: 18/413,483

(22) Filed: Jan. 16, 2024

(65) Prior Publication Data

US 2025/0232056 A1 Jul. 17, 2025

(51) Int. Cl.
G06F 21/62 (2013.01)
(52) U.S. Cl.
CPC .................. G06F 21/6245 (2013.01)
(58) Field of Classification Search
CPC .................................. G06F 21/6245
USPC ............................................. 726/1
See application file for complete search history.

(56) References Cited

U.S. PATENT DOCUMENTS

| | | | |
|---|---|---|---|
| 9,635,034 B2 | 4/2017 | Jamison et al. | |
| 11,063,760 B2 | 7/2021 | Subba | |
| 11,582,040 B2 | 2/2023 | Soundararajan et al. | |
| 2019/0051420 A1* | 2/2019 | Zhao | G16Z 99/00 |
| 2021/0243192 A1 | 8/2021 | Kim | |
| 2021/0282181 A1 | 9/2021 | Yi et al. | |
| 2021/0368341 A1 | 11/2021 | Liao | |
| 2022/0012101 A1 | 1/2022 | Lee | |
| 2022/0070267 A1 | 3/2022 | McCall et al. | |
| 2022/0094560 A1 | 3/2022 | Gaur et al. | |
| 2022/0210854 A1 | 6/2022 | Lam et al. | |
| 2022/0263820 A1 | 8/2022 | Barton et al. | |
| 2022/0277061 A1 | 9/2022 | Pagidi | |
| 2022/0338111 A1 | 10/2022 | Edge | |
| 2022/0353244 A1 | 11/2022 | Kahn et al. | |
| 2022/0400118 A1 | 12/2022 | Jiang et al. | |
| 2024/0427928 A1* | 12/2024 | Alphin, III | G06F 21/6245 |

* cited by examiner

*Primary Examiner* — Lan Dai T Truong
(74) *Attorney, Agent, or Firm* — Banner & Witcoff, Ltd.

(57) ABSTRACT

A computing platform may receive, from a plurality of IoT information sources, historical information associated with a user. The computing platform may generate, based on the historical information, a user specific policy, defining information distribution rules for the user. The computing platform may receive, from an information collection system, a request for information. The computing platform may identify whether or not the request for information requests personal information of the user. Based on identifying that the request for information requests the personal information of the user, the computing platform may identify whether or not the requested personal information violates the user specific policy. Based on identifying that the requested personal information does not violate the user specific policy, the computing platform may obscure the requested personal information, and send, to the information collection system, the obscured personal information.

20 Claims, 9 Drawing Sheets

Policy Generation Interface

Please select any information that you would like to prevent from being automatically shared:

First information type ☐
Second information type ☐
Third information type ☐

Security Notification

A security risk has been identified at "Information Collection System #1," which is requesting your information. Due to the identified risk, your information will not be sent.

Alternate System Recommendation

You are currently en route to "Information Collection System #1." A threat or anomaly has been identified for this system. Would you like to re-route to "Information Collection System #2," for which no threat or anomaly is identified?

FIG. 6

PERMISSION BASED INFORMATION TRANSFER BASED ON INTERNET OF THINGS (IoT) INSIGHTS

BACKGROUND

In some instances, permissions for different information collection devices might be different. In view of these discrepancies, in some instances, there may be security issues associated with the distribution of information to such devices. It may be important to develop a method that addresses such issues to improve information security.

SUMMARY

Aspects of the disclosure provide effective, efficient, scalable, and convenient technical solutions that address and overcome the technical problems associated with unwanted transmission of information from personal devices. In accordance with one or more embodiments of the disclosure, a computing platform comprising at least one processor, a communication interface, and memory storing computer-readable instructions may receive, from a plurality of internet of things (IoT) information sources, historical information associated with a user. The computing platform may generate, based on the historical information, a user specific policy, which may define information distribution rules for the user indicating types of information for which permission is needed prior to automated distribution of the corresponding information. The computing platform may receive, from an information collection system, a request for information. The computing platform may identify whether or not the request for information requests personal information of the user. Based on identifying that the request for information does request the personal information of the user, the computing platform may identify whether or not the requested personal information violates the user specific policy. Based on identifying that the requested personal information does not violate the user specific policy, the computing platform may obscure the requested personal information, and send, to the information collection system, the obscured personal information.

In one or more examples, the plurality of IoT information sources may include one or more of: an electric vehicle charger, an automated teller machine, a vehicle sensor, a wearable device, or a mobile device. In one or more examples, the historical information includes one or more of: text information, voice information, image information, geolocation information, social information, date of birth information, address information, passport numbers, or account numbers.

In one or more instances, generating the user specific policy may include generating a knowledge graph including a plurality of nodes and edges connecting pairs of nodes within the plurality of nodes, where each node may define a portion of the historical information, and each edge may define an information distribution rule, of the information distribution rules, indicating one or more of: 1) the corresponding node information may be automatically sent without prompting the user for permission, 2) the corresponding node information may be sent if the user provides permission via a prompt, or 3) the corresponding node information may not be sent. In one or more instances, the user specific policy is automatically generated based on the historical information.

In one or more examples, the user specific policy may be generated based on user input. In one or more examples, the computing platform may identify whether or not the request for information requests personal information of the user by comparing the requested information to known types of personal information.

In one or more instances, based on identifying that the request for information does not request the personal information of the user, the computing platform may automatically send the requested information without prompting the user for approval. In one or more instances, based on identifying that the requested personal information does violate the user specific policy, the computing platform may prevent the requested information from being sent without approval from the user.

In one or more examples, the computing platform may obscure the requested personal information by scrambling the requested personal information. In one or more examples, the computing platform may identify, based on the historical information, whether or not the information collection system exhibits anomalous behavior, where sending the obscured personal information to the information collection system may be responsive to identifying that the information collection system does not exhibit anomalous behavior.

In one or more instances, the computing platform may identify, based on the historical information, whether or not the information collection system exhibits anomalous behavior. Based on identifying that the information collection system exhibits anomalous behavior, the computing platform may identify an alternative information collection system that does not exhibit the anomalous behavior. In one or more instances, the computing platform may display, on a mapping interface, the information collection system, the alternative information collection system, and a recommendation to engage with the alternative information collection system rather than the information collection system.

BRIEF DESCRIPTION OF DRAWINGS

The present disclosure is illustrated by way of example and is not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to using IoT insights to perform permission based information transfer. For example, significant amounts of information may be sent from individuals' phones, computers, electric vehicles, or the like, which may, in some instances, include personal and/or otherwise sensitive information. These information collection devices may just use broad based permissions to obtain this personal information. It may be beneficial to provide increased control over what is collected from personal devices.

An application may run a check on all information that is sent out on personal devices. For example, when information (e.g., text, voice, images, geolocation information, and/or other information) is ex-filtrated from personal devices, it may be scanned for any sort of personal information, such as social information, date of birth information, address information, passport numbers, account numbers, and/or other information. The user may be provided with a summary of all the information to be sent. The user may approve information en masse, as a group, and/or individually. The user may set permissions and/or alert levels for each type of information for individual websites or information collectors.

In some instances, a map of IoT violations may be displayed. For example, a device may have previous issues or anomalies, and a notification may be displayed that another device is available several minutes down the road (e.g., such as another electric vehicle charger that may be farther down the road than an initially identified charger).

In some instances, specific kinds of information may be masked or spoofed. For example, an email address may be scrambled, fake information may be sent, information access may be denied, or the like. In some instances, certain information may be denied from going to specific types of IoT devices (e.g., by class of device). For example, an electric vehicle charger might not need an individual's phone number, and thus sending this information may be prevented. In some instances, the application may provide a color coded option that indicates the information is aligned with a request and/or whether the requestor is verified.

These and other features are described in greater detail below.

Figure 1A:
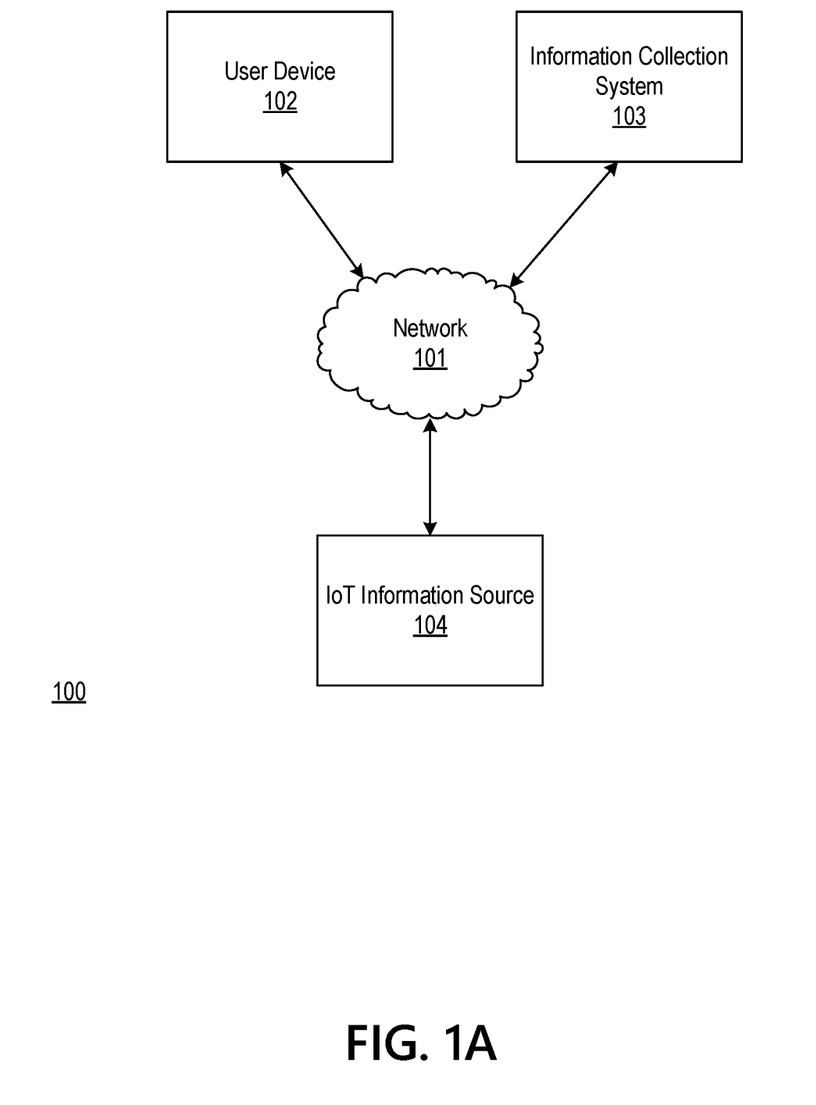
FIGS. 1A and 1B depict an illustrative computing environment for using IoT insights to perform permission based information transfer in accordance with one or more example embodiments.
Figure 1B:
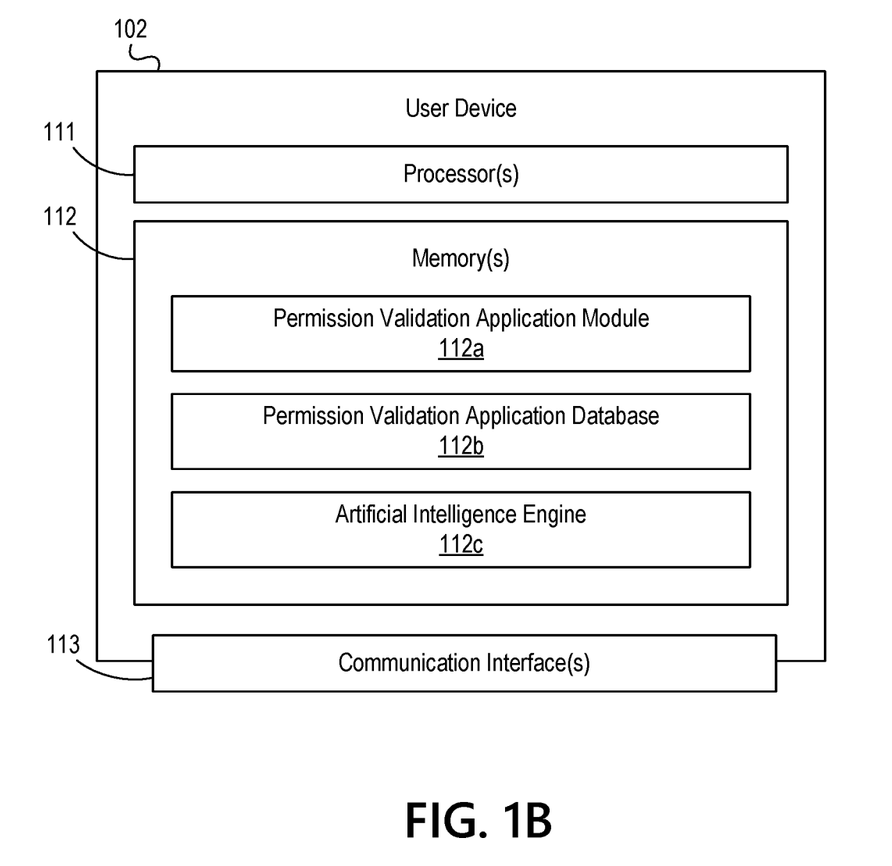

FIGS. 1A-1B depict an illustrative computing environment for using IoT insights to perform permission based information transfer in accordance with one or more example embodiments. Referring to FIG. 1A, computing environment 100 may include one or more computer systems. For example, computing environment 100 may include user device 102, information collection system 103, and IoT information source 104.

User device 102 may be or include one or more devices (e.g., laptop computers, desktop computers, smartphones, tablets, wearable devices, electric vehicle systems, and/or other devices) configured for use in transmitting information and/or performing other actions. For example, the user device 102 may collect information from and/or send information to various IoT systems. In some instances, the user device 102 may host a permission validation application that may be used to generate specific user permission policies defining permission rules for the automated transmission of information from the user device 102 to other devices. In some instances, the user device 102 may be configured to display one or more graphical user interfaces (e.g., permission interfaces, security notifications, or the like). Any number of such user devices may be used to implement the techniques described herein without departing from the scope of the disclosure.

Information collection system 103 may include one or more computing devices (e.g., electric vehicle chargers, automated teller machines, voice based assistant devices, servers, and/or other IoT systems). For example, the information collection system 103 may be configured to request information from user devices. For example, the information collection system 103 may request information for the purpose of processing events, requests, or the like. In some instances, this requested information may include personal and/or otherwise sensitive information. Any number of such user devices may be used to implement the techniques described herein without departing from the scope of the disclosure.

IoT information source 104 may include one or more computing devices (e.g., electric vehicle chargers, automated teller machines, wearable devices, servers, and/or other IoT systems). For example, the IoT information source 104 may be configured to provide information to a centralized device or system (e.g., information from these various sources may be sent to the user device 102) associated with a given user. Any number of such user devices may be used to implement the techniques described herein without departing from the scope of the disclosure.

Computing environment 100 also may include one or more networks, which may interconnect user device 102, information collection system 103, and IoT information source 104. For example, computing environment 100 may include a network 101 (which may interconnect, e.g., user device 102, information collection system 103, and IoT information source 104).

In one or more arrangements, user device 102, information collection system 103, and IoT information source 104 may be any type of computing device capable of receiving a user interface, receiving input via the user interface, and communicating the received input to one or more other computing devices. For example, user device 102, information collection system 103, IoT information source 104, and/or the other systems included in computing environment 100 may, in some instances, be and/or include server computers, desktop computers, laptop computers, tablet computers, smart phones, wearable devices, electric vehicle chargers, automated teller machines, other IoT devices, or the like that may include one or more processors, memories, communication interfaces, storage devices, and/or other components. As noted above, and as illustrated in greater detail below, any and/or all of user device 102, information collection system 103, IoT information source 104 may, in some instances, be special-purpose computing devices configured to perform specific functions.

Referring to FIG. 1B, user device 102 may include one or more processors 111, memory 112, and communication interface 113. A data bus may interconnect processor 111, memory 112, and communication interface 113. Communication interface 113 may be a network interface configured to support communication between user device 102 and one or more networks (e.g., network 101, or the like). Memory 112 may include one or more program modules having instructions that when executed by processor 111 cause user device 102 to perform one or more functions described herein and/or one or more databases that may store and/or otherwise maintain information which may be used by such program modules and/or processor 111. In some instances, the one or more program modules and/or databases may be stored by and/or maintained in different memory units of user device 102 and/or by different computing devices that may form and/or otherwise make up user device 102. For example, memory 112 may have, host, store, and/or include permission validation application module 112*a*, permission validation application database 112*b*, artificial intelligence engine 112*c*. Permission validation application module 112*a* may have instructions that direct and/or cause user device 102 to enforce user policies for transmitting information. Permission validation application database 112*b* may store information that may be used to support the permission validation application in enforcing user policies for transmitting information. Artificial intelligence engine 112*c* may train, deploy, and/or otherwise refine the user policies through both initial training and one or more dynamic feedback loops that may, e.g., enable continuous improvement of the policies in protecting against the transmission of personal and/or otherwise sensitive information.

Figure 2A:
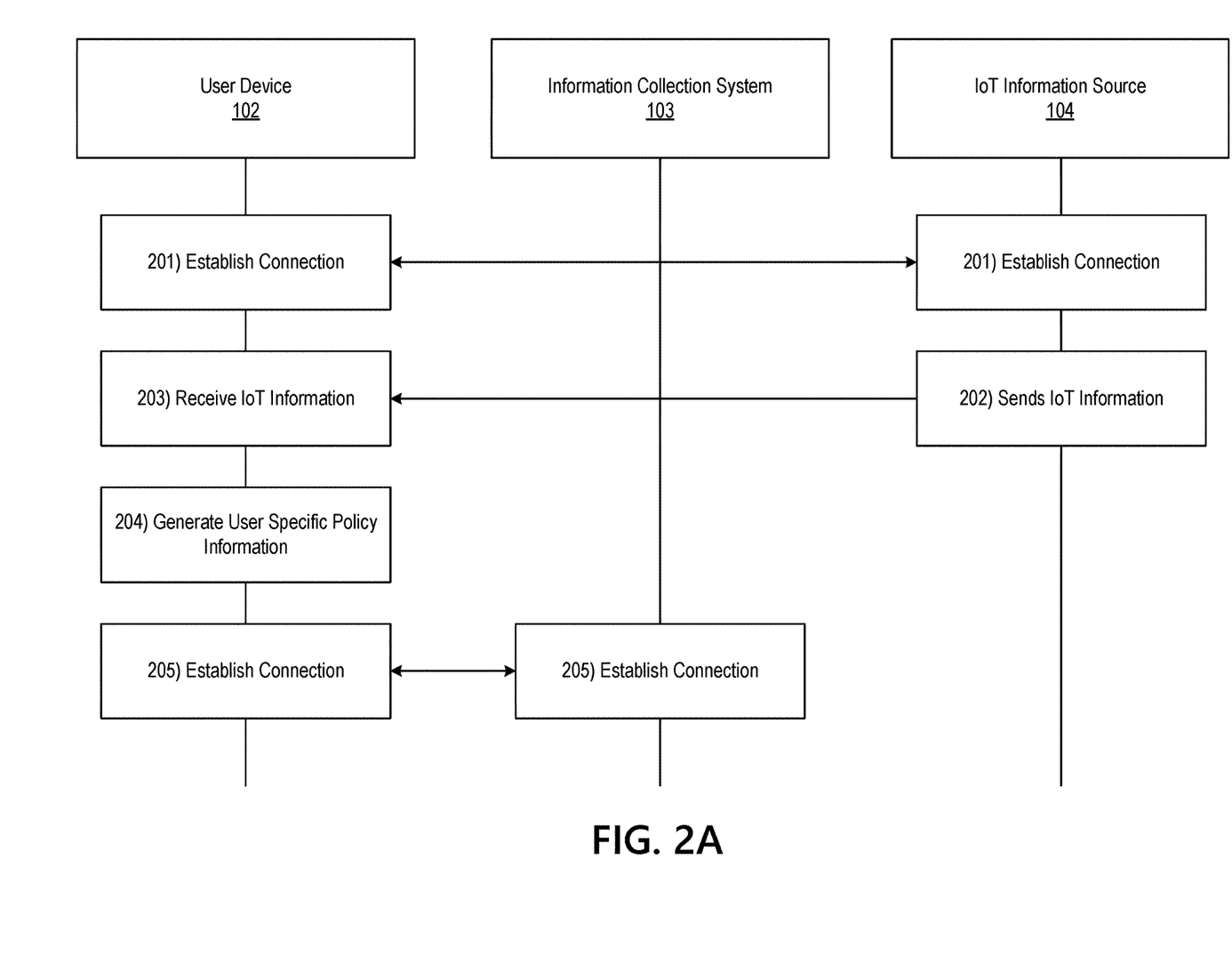
FIGS. 2A-2D depict an illustrative event sequence for using IoT insights to perform permission based information transfer in accordance with one or more example embodiments.

FIGS. 2A-2D depict an illustrative event sequence for using IoT insights to perform permission based information transfer in accordance with one or more example embodiments. Referring to FIG. 2A, at step 201, IoT information source 104 may establish a connection with the user device 102. For example, the IoT information source 104 may establish a first wireless data connection to with the user device 102 to link the IoT information source 104 with the user device 102 (e.g., in preparation for sending IoT information). In some instances, the IoT information source 104 may identify whether or not a connection is already established with the user device 102. If a connection is already established with the user device 102, the IoT information source 104 might not re-establish the connection. If a connection is not yet established with the user device 102, the IoT information source 104 may established the first wireless data connection as described herein.

At step 202, IoT information source 104 may send IoT information to the user device 102. For example, the IoT information source 104 may send the IoT information to the user device 102 while the first wireless data connection is established. For example, the IoT information source 104 may send information, associated with a user of the user device 102, to the user device 102. In some instances, the IoT information source 104 may send pictures, scanned documents, license information, tax information, social security information, voice records, videos, biometric information, driving patterns/information, text information, images, geolocation information, date of birth information, address information, passport numbers, account numbers, subscription information, communication information, and/or other information.

At step 203, the user device 102 may receive the IoT information sent at step 202. For example, the user device 102 may receive the IoT information via the communication interface 113 and while the first wireless data connection is established. In some instances, the user device 102 may also receive information from various other databases, open source systems, or the like.

At step 204, a permission validation application at the user device 102 may generate a user specific policy for the user. For example, the permission validation application may generate information distribution rules for the user indicating types of information for which permission is needed prior to automated distribution of the corresponding information. For example, these information distribution rules may indicate one or more of: information that may be automatically distributed to information collection systems without further permission being granted by the user, information that may be distributed to information collection systems based on receiving additional/specific permission from the user, and information that may not be distributed to information collection systems.

In some instances, the permission validation application may generate these information distribution rules automatically based on the historical IoT information. For example, the permission validation application may be trained to dynamically identify whether the historical IoT information comprises personal information, and to generate rules preventing the unauthorized distribution of such personal information. Additionally or alternatively, the permission validation application may use crowdsourced information indicating rules generated for other users for the same types of information to identify a corresponding information distribution rule (e.g., a majority of other users have selected a particular rule for a particular type of information, or the like).

Figure 4:
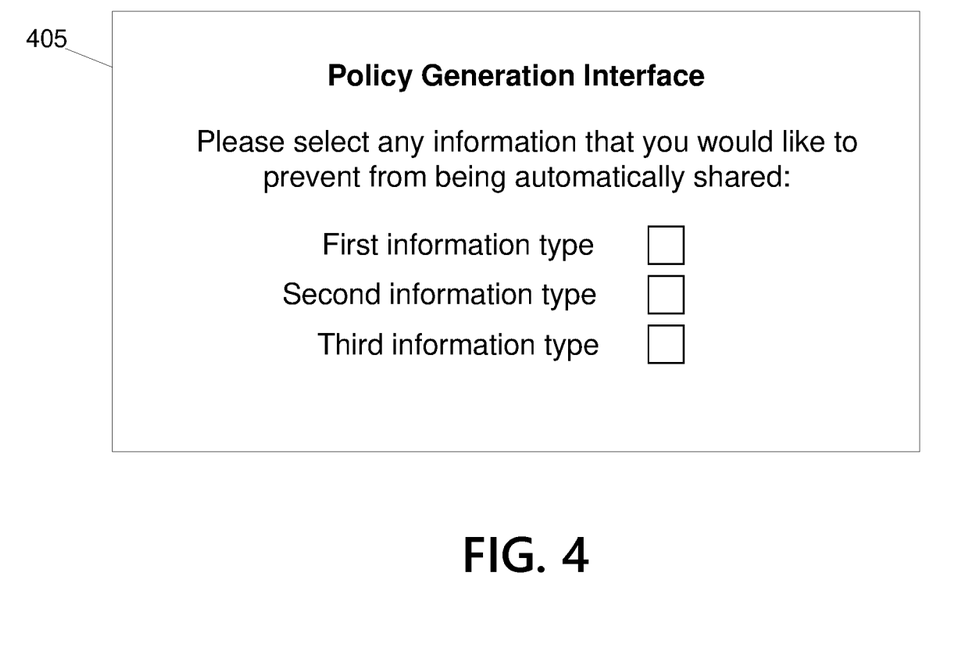
FIGS. 4-6 depict illustrative user interfaces for using IoT insights to perform permission based information transfer in accordance with one or more example embodiments.

Additionally or alternatively, the permission validation application may generate these information distribution rules based on user input. For example, the permission validation application may cause display of a graphical user interface similar to graphical user interface 405, which is shown in FIG. 4. In doing so, the permission validation application may provide an interface that allows the user to select types of information that may be automatically released by the user device 102, released based on further permission from the user (e.g., prompt the user prior to sending), not be released, or the like.

In some instances, in generating the information distribution rules (e.g., automatically and/or based on user input), the permission validation application may generate a knowledge graph, specific to the user, that includes a plurality of nodes and edges connecting the various nodes. For example, each node may represent a particular piece or type of information, and the edges may represent and/or otherwise define the information distribution rule corresponding to the connected node. In some instances, the permission validation application may generate an alternative artificial intelligence based representation of the information distribution rules.

Although generation of the user specific policy is described as being performed at the user device 102 by the permission validation application, such a policy may, in some instances, be generated at a central computing platform that configures, maintains, and/or otherwise hosts the permission validation application. In these instances, the knowledge graph may represent the information distribution rules corresponding to a plurality of different users. Once the permission validation application is configured, in these instances, it may be distributed to various user devices such as the user device 102.

At step 205, the information collection system 103 may establish a connection with the user device 102. For example, the information collection system 103 may establish a second wireless data connection to link the user device 102 to the information collection system 103 (e.g., in preparation for requesting information). In some instances, the information collection system 103 may identify whether a connection is already established with the user device 102. For example, if the information collection system 103 identifies that a connection is already established with the user device 102, the information collection system 103 might not re-establish the connection. If the information collection system 103 identifies that a connection is not yet established with the user device 102, the information collection system 103 may establish the second wireless data connection as described herein.

Figure 2B:
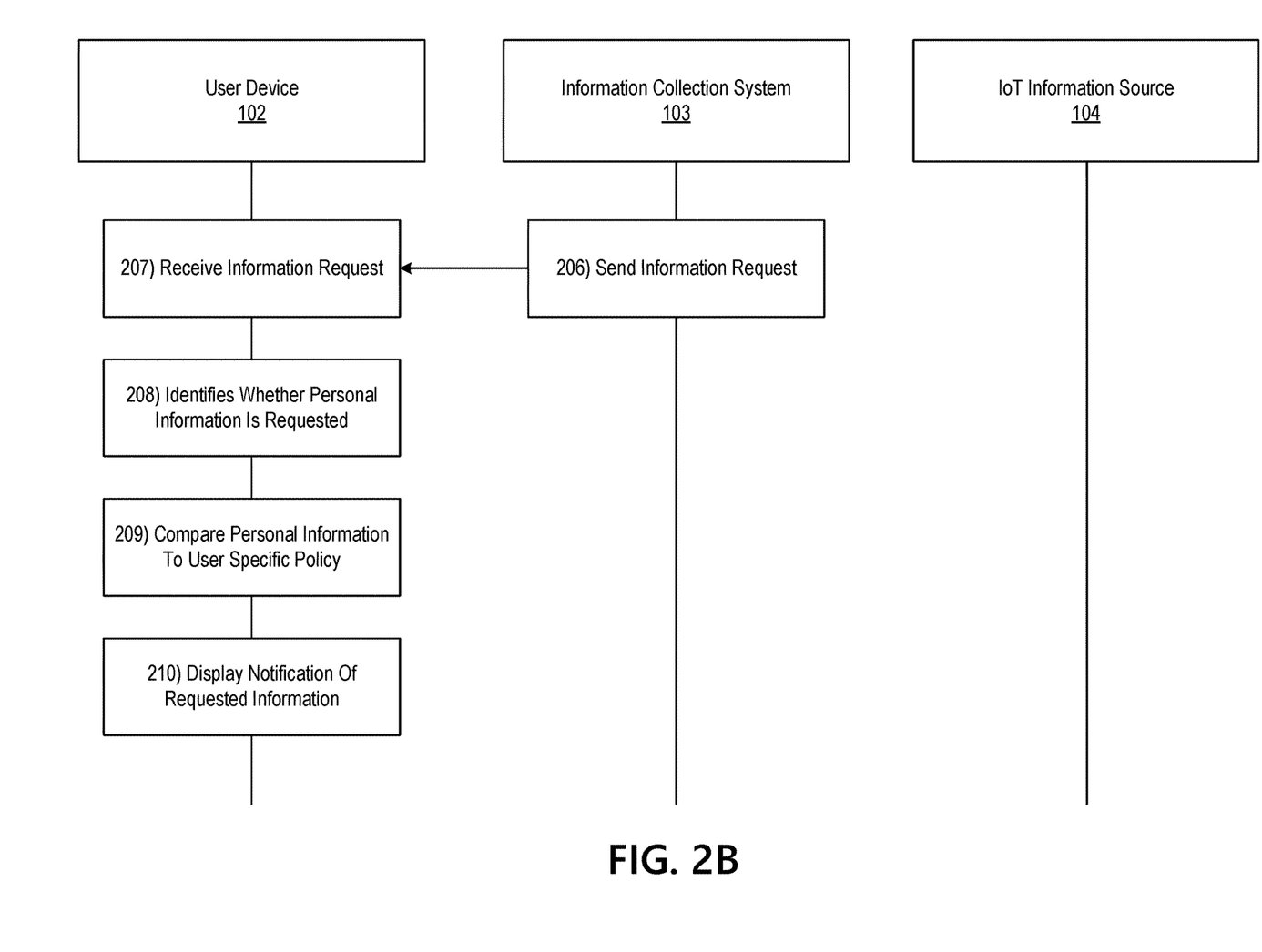

Referring to FIG. 2B, at step 206, the information collection system 103 may send a request for information to the user device 102. For example, the information collection system 103 may send the request for information while the second wireless data connection is established. In some instances, the request may be a request for personal information, non-personal information, and/or other information.

At step 207, the user device 102 may receive the information request sent at step 206. For example, the user device 102 may receive the information request via the communication interface 113 and while the second wireless data connection is established.

At step 208, the user device 102 may identify whether the information request, received at step 207 is requesting personal information (e.g., information that may be sensitive and/or otherwise uniquely associated with the user) or non-personal information. For example, the permission validation application may previously have been taught and/or otherwise trained on what types of information may be personal (e.g., such as social information, date of birth information, address information, passport numbers, account numbers, and/or other information). If the information request is requesting personal information, the user device 102 may proceed to step 209. If the information request is not requesting personal information, the user device 102 may proceed to step 214 (e.g., to send the requested information to the information collection system 103 without further prompting the user).

At step 209, the user device 102 may compare the requested personal information to the user specific policy to identify how the user device 102 should proceed with regard to transmission of the requested personal information. For example, the permission validation application may identify a node of the knowledge graph corresponding to the requested personal information, and identify (e.g., based on the corresponding edge) a corresponding information distribution rule. In instances where the corresponding information distribution rule indicates that the personal information should not be sent, or that additional permission should be obtained prior to sending the personal information, the user device 102 may proceed to step 210. In instances where the information distribution rule indicates that the personal information may be sent, the user device 102 may proceed to step 211.

At step 210, the user device 102 may display (e.g., via the permission validation application) a notification indicating the decision made at step 209 based on the user specific policy. For example, if the decision indicated that the requested information will not be sent, the user device 102 may display a graphical user interface indicating that the requested information will not be sent. Similarly, if the decision indicated that additional permission is needed prior to sending the requested information, the user device 102 may display a graphical user interface prompting for such permission. In some instances, rather than displaying the graphical user interface prompting for such permission at the user device 102, the permission validation application may cause and/or otherwise direct another user device to display the permission interface. For example, the user specific policy may define an authorized proxy (such as a parent of a child, or the like) that may be authorized to provide the permission in addition or as an alternative to the user themselves. In these instances, if permission is received, the user device 102 may proceed to step 211. Otherwise, if permission is not received, the user device 102 might not send the information, and the method may end (and/or a notification may be sent to the information collection system 103 indicating that the information will not be shared).

Figure 2C:
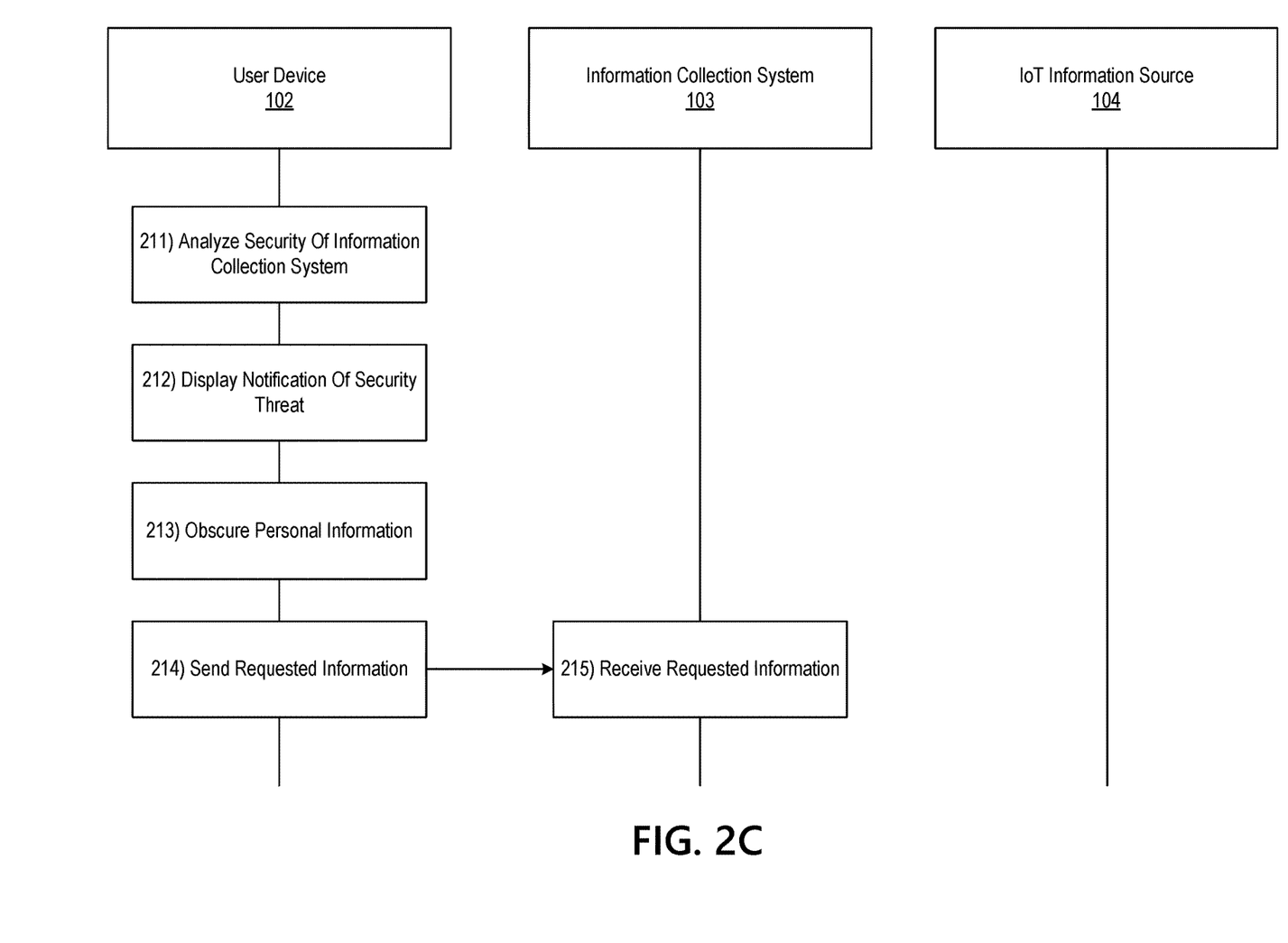

Referring to FIG. 2C, at step 211, the user device 102 may analyze security of the information collection system 103. For example, using the IoT information received at step 203, the permission validation application may identify whether behavior of the information collection system 103 amounts to an anomaly and/or otherwise malicious behavior (which may e.g., indicate a security threat). For example, the permission validation application may identify whether more than a threshold number of threat incidents have occurred and/or otherwise been reported for the information collection system 103 (e.g., by the user themselves and/or other users). If an anomaly and/or threat is identified for the information collection system 103, the user device 102 may proceed to step 212. Otherwise, if an anomaly and/or threat is not identified for the information collection system 103, the user device 102 may proceed to step 213.

Figure 5:
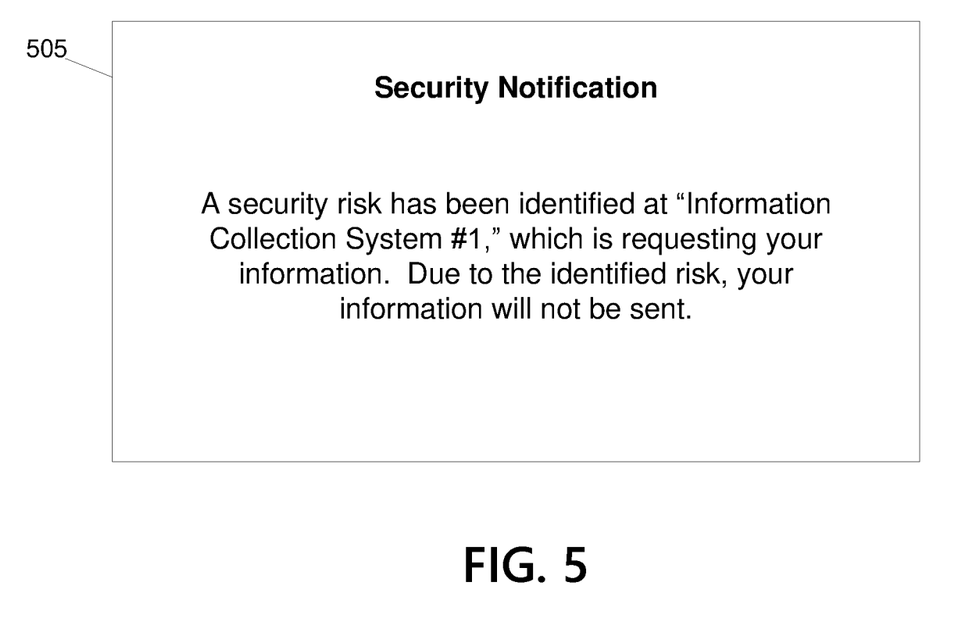
Figure 6:
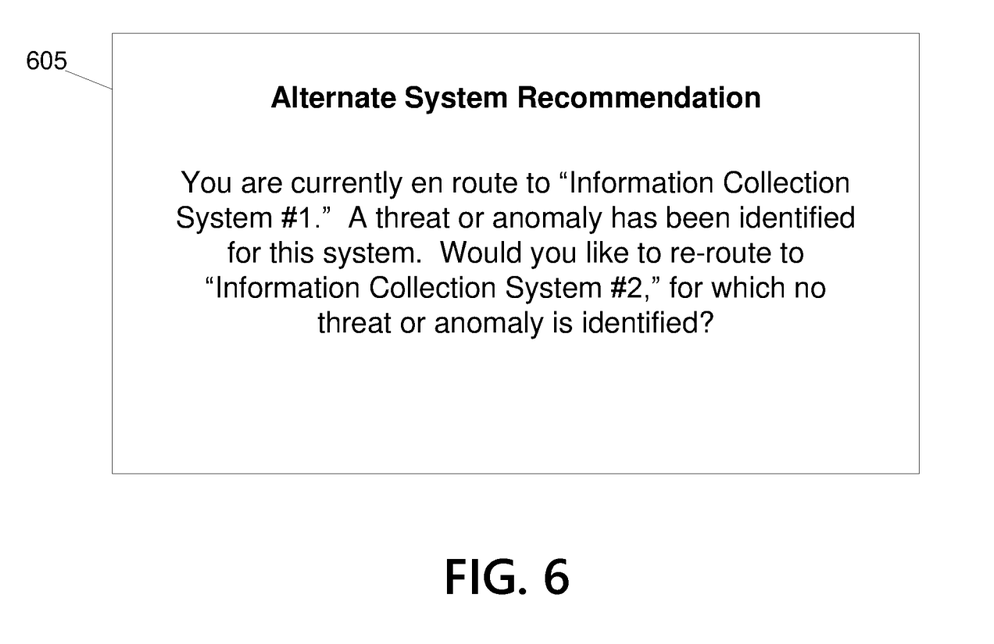

At step 212, the user device 102 may display a notification indicating the security threat identified at step 211. For example, the user device 102 may display a graphical user interface similar to graphical user interface 505, which is illustrated in FIG. 5. In some instances, the user device 102 may display a mapping interface that may, e.g., display a location of one or more information collection systems. In these instances, the user device 102 may display an indication of a threat or anomaly identified at a first information collection system, and may instead suggest an alternative information collection system at which no anomalies and/or threats have been identified (e.g., route to a different electric vehicle charges where no issues have been identified, or the like). For example, the user device 102 may display a graphical user interface similar to graphical user interface 605, which is illustrated in FIG. 6. In some instances, the mapping interface may further indicate types of information to be requested from the various available information collection systems, which may, e.g., enable the user to select one accordingly (e.g., based on which system requests the least amount of information, or the like). Subsequently, the method may end (and/or a notification may be sent to the information collection system 103 indicating that the requested information will not be sent).

At step 213, the permission validation application may obscure the personal information to be sent to the information collection system 103. For example, the permission validation application may scramble the personal information in a way that may prevent understanding of the personal information if intercepted en route from the user device 102 to the information collection system 103. For example, the permission validation application may scramble a voice record, modulate a pitch, tone, or rate of speech, scramble an image or text, and/or otherwise scramble and/or obscure non-voice based personal information.

At step 214, the permission validation application may send the requested information (e.g., which may, e.g., have been obscured at step 213) to the information collection system 103. For example, the permission validation application may send the requested information to the information collection system 103 via the communication interface 113 and while the second wireless data connection is established.

At step 215, the information collection system 103 may receive the information sent at step 214. For example, the information collection system 103 may receive the information while the second wireless data connection is established.

Figure 2D:
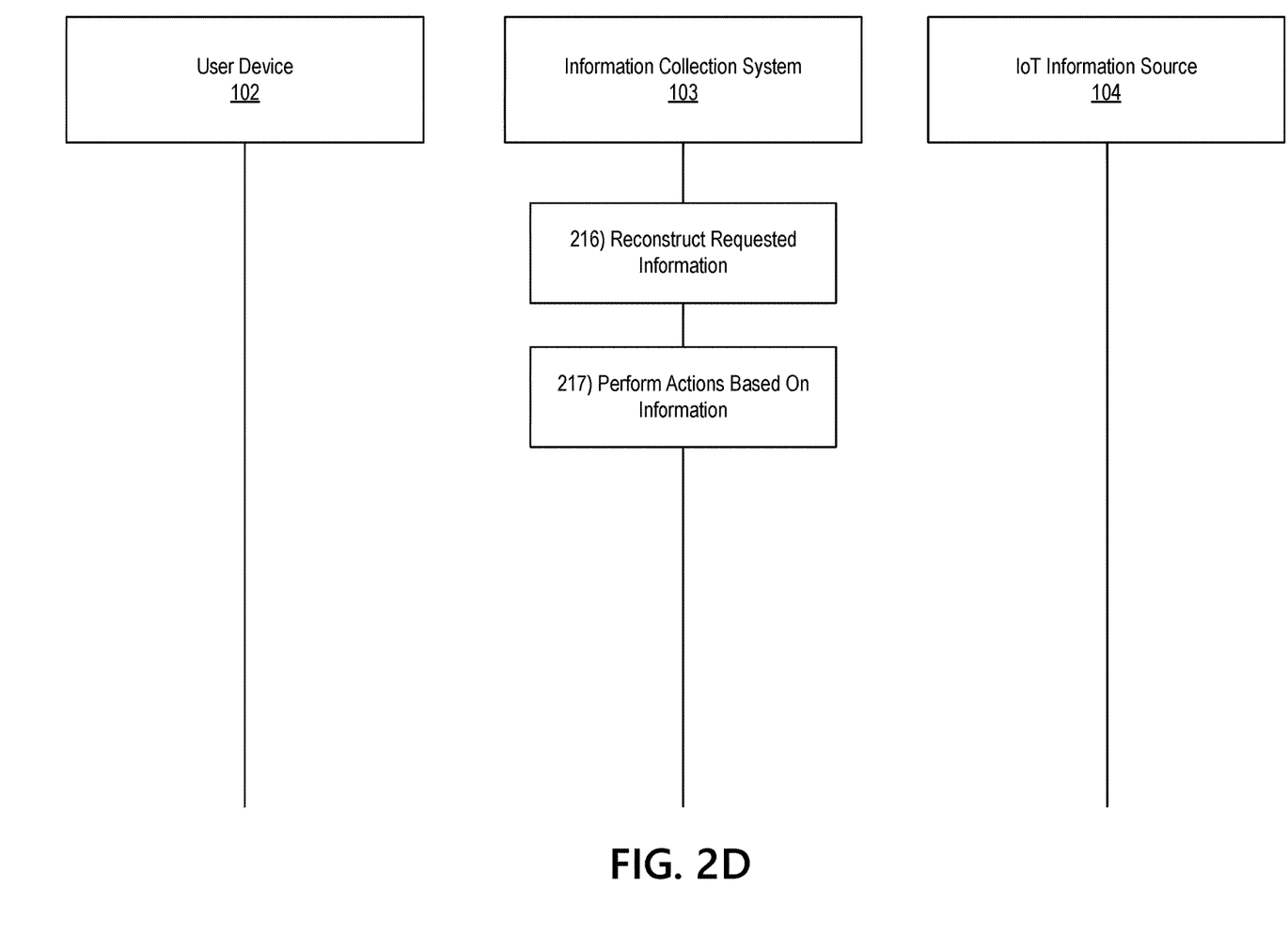

Referring to FIG. 2D, at step 216, the information collection system 103 may reconstruct the obscured information received at step 215. For example, the information collection system 103 may reconstruct the obscured information using a private key and/or other access credentials provided from the user device 102 (which may, e.g., have been provided via a separate channel, or the like). In doing so, the information collection system 103 may reconstruct any personal information that was obscured for transmission.

At step 217, the information collection system 103 may perform one or more actions based on the information identified at step 216. For example, the information collection system 103 may process a request, execute an event, and/or perform other actions.

Figure 3:
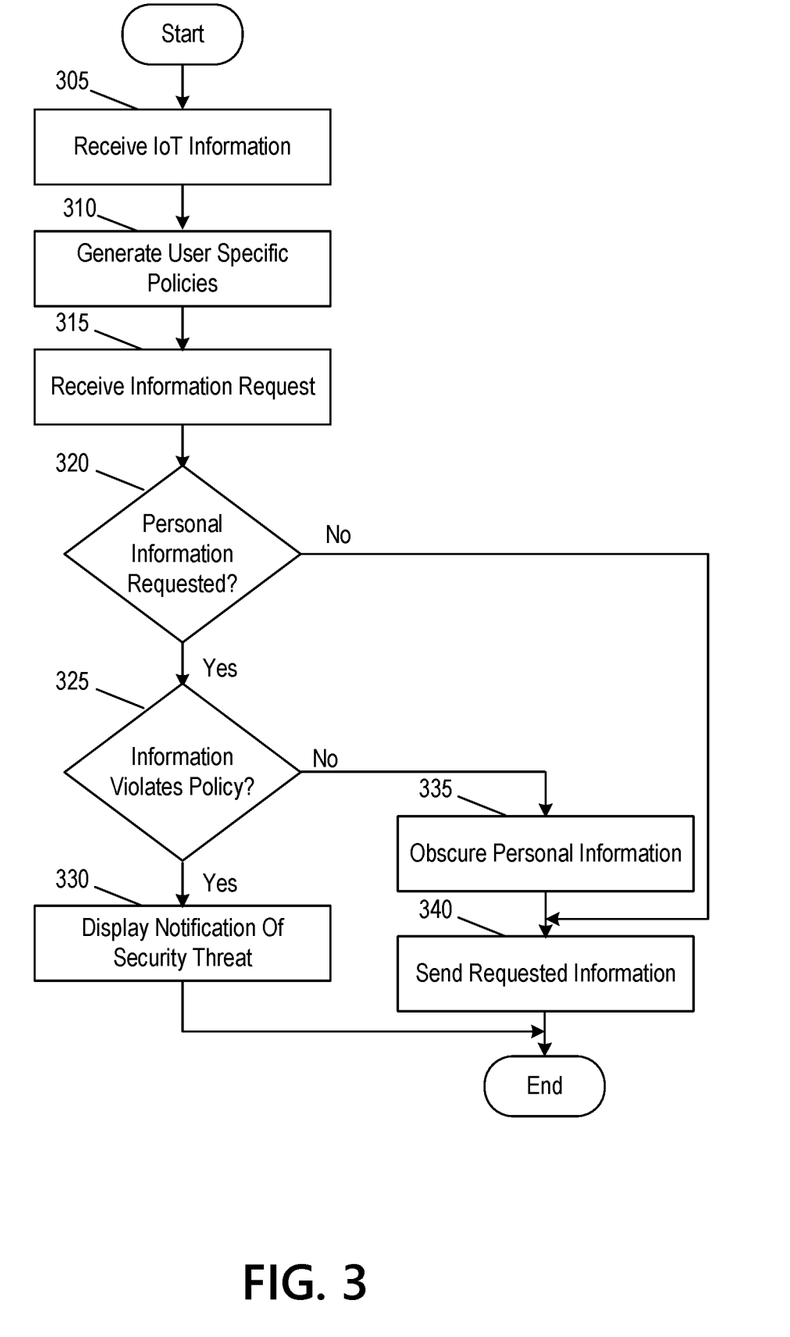
FIG. 3 depicts an illustrative method for using IoT insights to perform permission based information transfer in accordance with one or more example embodiments.

FIG. 3 depicts an illustrative method for using IoT insights to perform permission based information transfer in accordance with one or more example embodiments. Referring to FIG. 3, at step 305, a computing platform comprising one or more processors, memory, and a communication interface may receive IoT information. At step 310, the computing platform may generate user specific policy information. At step 315, the computing platform may receive a request for information. At step 320, the computing platform may identify whether the request is for personal information. If the request is not for personal information, the computing platform may proceed to step 340 to send the requested information.

If the request is for personal information, the computing platform may proceed to step 325. At step 325, the computing platform may identify whether the requested information violates a user specific policy. If the requested information does violate the user specific policy, the computing platform may proceed to step 330 to display a notification of a security threat.

If the requested information does not violate the user specific policy, the computing platform may proceed to step 335. At step 335, the computing platform may obscure the personal information. At step 340, the computing platform may send the requested information to the requesting device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing device comprising:
   at least one processor;
   a communication interface communicatively coupled to the at least one processor; and
   memory storing computer-readable instructions that, when executed by the at least one processor, cause the computing device to:
   receive, from a plurality of internet of things (IoT) information sources, historical information associated with a user;
   generate, based on the historical information, a user specific policy, wherein the user specific policy defines information distribution rules for the user indicating types of information for which permission is needed prior to automated distribution of the corresponding information;
   receive, from an information collection system, a request for information;

identify whether or not the request for information requests personal information of the user; and based on identifying that the request for information does request the personal information of the user:

identify whether or not the requested personal information violates the user specific policy, and based on identifying that the requested personal information does not violate the user specific policy:

obscure the requested personal information, and send, to the information collection system, the obscured personal information.

2. The computing device of claim 1, wherein the plurality of IoT information sources includes one or more of: an electric vehicle charger, an automated teller machine, a vehicle sensor, a wearable device, or a mobile device.

3. The computing device of claim 1, wherein the historical information comprises one or more of: text information, voice information, image information, geolocation information, social information, date of birth information, address information, passport numbers, or account numbers.

4. The computing device of claim 1, wherein generating the user specific policy comprises generating a knowledge graph including a plurality of nodes and edges connecting pairs of nodes within the plurality of nodes, wherein each node defines a portion of the historical information, and wherein each edge defines an information distribution rule, of the information distribution rules, indicating one or more of:

the corresponding node information may be automatically sent without prompting the user for permission, the corresponding node information may be sent if the user provides permission via a prompt, or the corresponding node information may not be sent.

5. The computing device of claim 1, wherein the user specific policy is automatically generated based on the historical information.

6. The computing device of claim 1, wherein the user specific policy is generated based on user input.

7. The computing device of claim 1, wherein identifying whether or not the request for information requests personal information of the user comprises comparing the requested information to known types of personal information.

8. The computing device of claim 1, wherein the memory stores additional computer-readable instructions that, when executed by the at least one processor, cause the computing device to:

based on identifying that the request for information does not request the personal information of the user, automatically send the requested information without prompting the user for approval.

9. The computing device of claim 1, wherein the memory stores additional computer-readable instructions that, when executed by the at least one processor, cause the computing device to:

based on identifying that the requested personal information does violate the user specific policy, prevent the requested information from being sent without approval from the user.

10. The computing device of claim 1, wherein obscuring the requested personal information comprises scrambling the requested personal information.

11. The computing device of claim 1, wherein the memory stores additional computer-readable instructions that, when executed by the at least one processor, cause the computing device to:

identify, based on the historical information, whether or not the information collection system exhibits anomalous behavior, wherein sending the obscured personal information to the information collection system is responsive to identifying that the information collection system does not exhibit anomalous behavior.

12. The computing device of claim 1, wherein the memory stores additional computer-readable instructions that, when executed by the at least one processor, cause the computing device to:

identify, based on the historical information, whether or not the information collection system exhibits anomalous behavior; and based on identifying that the information collection system exhibits anomalous behavior, identify an alternative information collection system that does not exhibit the anomalous behavior.

13. The computing device of claim 12, wherein the memory stores additional computer-readable instructions that, when executed by the at least one processor, cause the computing device to:

display, on a mapping interface, the information collection system, the alternative information collection system, and a recommendation to engage with the alternative information collection system rather than the information collection system.

14. A method comprising:

at a computing platform comprising at least one processor, a communication interface, and memory:

receiving, from a plurality of internet of things (IoT) information sources, historical information associated with a user;

generating, based on the historical information, a user specific policy, wherein the user specific policy defines information distribution rules for the user indicating types of information for which permission is needed prior to automated distribution of the corresponding information;

receiving, from an information collection system, a request for information;

identifying whether or not the request for information requests personal information of the user; and based on identifying that the request for information does request the personal information of the user:

identifying whether or not the requested personal information violates the user specific policy, and based on identifying that the requested personal information does not violate the user specific policy:

obscuring the requested personal information, and sending, to the information collection system, the obscured personal information.

15. The method of claim 14, wherein the plurality of IoT information sources includes one or more of: an electric vehicle charger, an automated teller machine, a vehicle sensor, a wearable device, or a mobile device.

16. The method of claim 14, wherein the historical information comprises one or more of: text information, voice information, image information, geolocation information, social information, date of birth information, address information, passport numbers, or account numbers.

17. The method of claim 14, wherein generating the user specific policy comprises generating a knowledge graph including a plurality of nodes and edges connecting pairs of nodes within the plurality of nodes, wherein each node defines a portion of the historical information, and wherein each edge defines an information distribution rule, of the information distribution rules, indicating one or more of:
the corresponding node information may be automatically sent without prompting the user for permission,
the corresponding node information may be sent if the user provides permission via a prompt, or
the corresponding node information may not be sent.

18. The method of claim 14, wherein the user specific policy is automatically generated based on the historical information.

19. The method of claim 14, wherein the user specific policy is generated based on user input.

20. One or more non-transitory computer-readable media storing instructions that, when executed by a computing platform comprising at least one processor, a communication interface, and memory, cause the computing platform to:
receive, from a plurality of internet of things (IoT) information sources, historical information associated with a user;
generate, based on the historical information, a user specific policy, wherein the user specific policy defines information distribution rules for the user indicating types of information for which permission is needed prior to automated distribution of the corresponding information;
receive, from an information collection system, a request for information;
identify whether or not the request for information requests personal information of the user; and
based on identifying that the request for information does request the personal information of the user:
identify whether or not the requested personal information violates the user specific policy, and
based on identifying that the requested personal information does not violate the user specific policy:
obscure the requested personal information, and
send, to the information collection system, the obscured personal information.

\* \* \* \* \*